United States Patent [19]

Huang

[11] Patent Number: 5,226,658
[45] Date of Patent: Jul. 13, 1993

[54] POSITION-RETAINING BAR FOR A TOY STROLLER

[76] Inventor: Ming-Tai Huang, 4th Fl., No. 302, Pai Ling Wu Rd., Taipei, Taiwan

[21] Appl. No.: 847,659
[22] Filed: Mar. 5, 1992
[51] Int. Cl.⁵ .............................................. B62B 7/08
[52] U.S. Cl. .................................... 280/644; 280/42; 280/650; 403/102
[58] Field of Search .................. 280/639, 38, 641, 642, 280/644, 42, 650, 658; 403/100, 101, 102

[56] References Cited

U.S. PATENT DOCUMENTS 3,390,893  7/1968  MacLaren ........................... 280/644
4,765,645  8/1988  Shamie ................................. 280/644

Primary Examiner—Richard M. Camby
Attorney, Agent, or Firm—Fitch, Even, Tabin & Flannery

[57] ABSTRACT

An improved position-retaining bar for a toy stroller. The position-retaining bar is folded or extended consistently with the toy stroller and consists of two pivotally combined strips. One of the strips has a flexible security buckle extending therefrom for restraining the other strip when the position-retaining bar is folded to a predetermined extent. Therefore, the toy stroller can only be folded to a predetermined extent when front wheels of the toy stroller are hindered during a stroll therewith, thereby protecting a child who pushes the toy stroller from tumbling and falling.

1 Claim, 3 Drawing Sheets

POSITION-RETAINING BAR FOR A TOY STROLLER

BACKGROUND OF THE INVENTION

The present invention relates to an improved position-retaining bar for a toy stroller and, more particularly, to a position-retaining bar which has a security buckle for restraining the toy stroller from being unintentionally folded.

Generally, referring to FIG. 4, a toy stroller 40 has two pushing rods 41 and two cross rods 42. Each pushing rod 41 is fixed with a handle at an upper end thereof. Each cross rod 42, at an upper end thereof, is pivotally attached to an L-shaped joint which is in turn pivotally attached to each pushing rod. The cross rods 42 are pivotally combined at middle portions thereof. Further referring to FIG. 5, a conventional position-retaining bar 50 consists of two pivotally connected strips 51. Each strip 51 has a first end pivotally attached to a lower end of each cross rod 42 and a second end formed with a finger 52. A stop 53 is formed on a side of each strip 51, so that the finger 52 of a first strip 51 rests on the stop 53 of a second strip 51, while the finger 52 of the second strip 51 rests on the stop 53 of the first strip 51. A major problem of this type of position-retaining bar is that the toy stroller 40 is apt to be folded when the front wheels thereof are hindered (see FIG. 4) if the position-retaining bar 50 is not adequately unfolded at beginning. As a result, a child who pushes the toy stroller 40 might tumble and fall because the toy stroller 40 folds suddenly as the position-retaining bar 50 fails to remain in shape. Therefore, this invention is intended to solve this problem.

SUMMARY OF THE INVENTION

The present invention provides an improved position-retaining bar for a toy stroller. The position-retaining bar is folded or extended consistently with the toy stroller and consists of two pivotally combined strips. One of the strips has a flexible security buckle extending therefrom for restraining the other strip when the position-retaining bar is folded to a predetermined extent. Therefore, the toy stroller can only be folded to a predetermined extent when front wheels of the toy stroller are hindered during a stroll therewith (see FIG. 4), thereby protecting a child who pushes the toy stroller from tumbling and falling.

For a better understanding of the present invention and objects thereof, a study should be made to the detailed description of the embodiments described hereinafter, in relation to the accompanying drawings.

DETAILED DESCRIPTION OF THE PREFERRED EMBODIMENT

Figure 1:
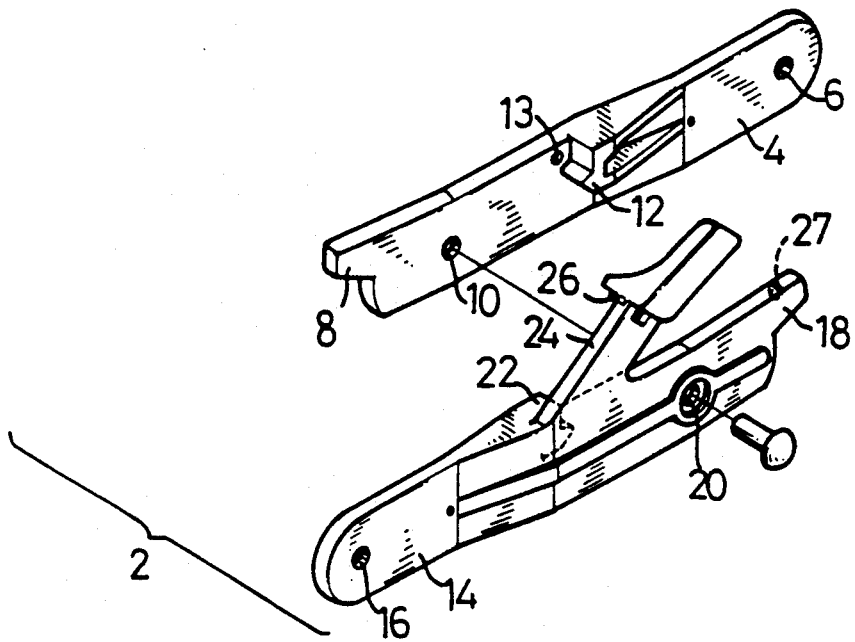
FIG. 1 is an exploded view of a position-retaining bar for a toy stroller in accordance with the present invention.
Figure 4:
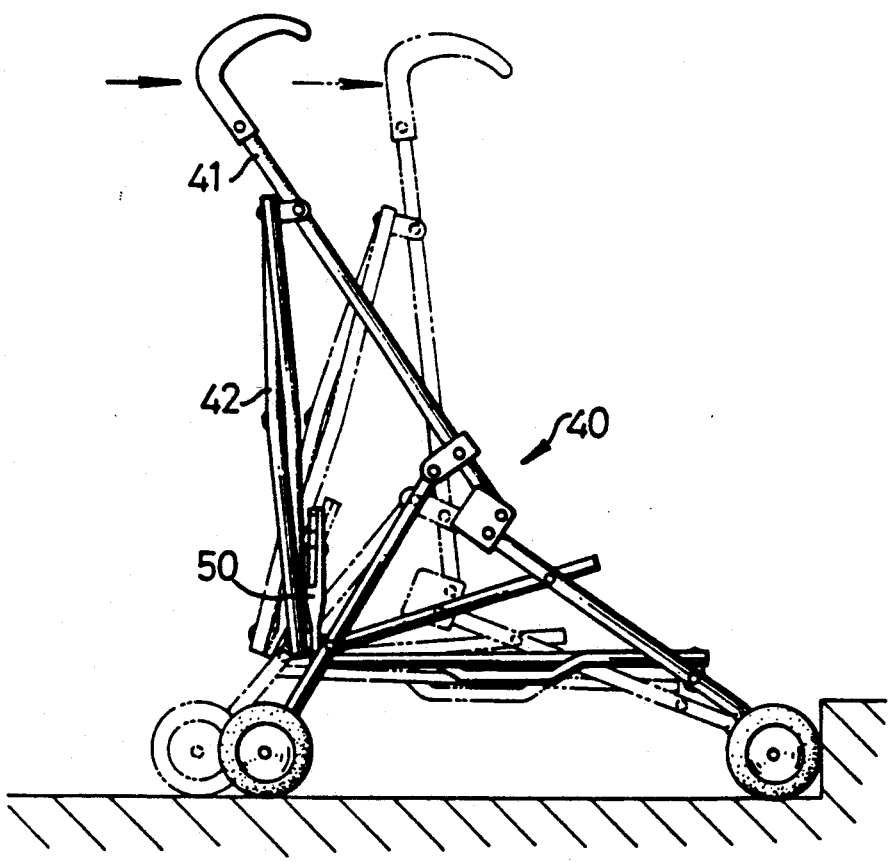
FIG. 4 is a plane view of a toy stroller employing a conventional position-retaining bar.
Figure 5:
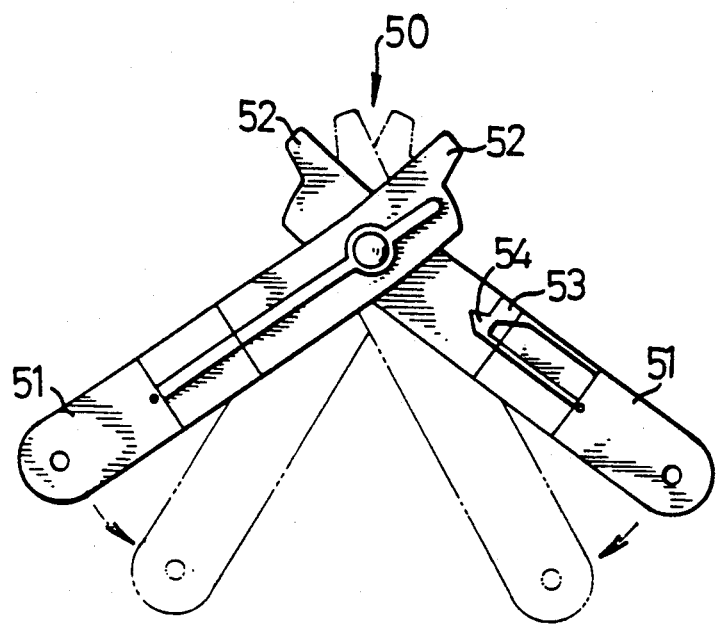
FIG. 5 is a plane view of a position-retaining bar in accordance with prior art.

In accordance with the present invention, referring to FIG. 1, a position-retaining bar 2 for a toy stroller 40 (see FIG. 4) consists of a first strip 4 and a second strip 14 which are pivotally connected together. The first strip 4 is similar to a conventional strip 51 (see FIG. 5), i.e., there is a hole 6 at a first end thereof, a finger 8 extending from a second end thereof, a hole 10 in the vicinity of the finger 8, a stop 12 being integrated on a side thereof, and a bore 13 in the vicinity of the stop 12.

The second strip 14 has a hole 16 at a first end thereof, a finger 18 extending from a second end thereof, a hole 20 in the vicinity of the finger 18, a stop 22 being integrated on a side thereof, a buckle 24 extending at an angle therefrom above the stop 22, and a protrusion 27 protruding from a side of the finger 18. The buckle 24, at a free end thereof, is formed with a wedge-like portion defining an inclined surface facing the first strip 4. A tab 26 extends from and below the wedge-like portion of the buckle 24 at a distance which is slightly greater than a width of the strip 4 from the buckle 24, so that the strip 4 can be restrained between the buckle 24 and the tab 26. A rivet (not shown) is inserted through the holes 22 and 10, thereby combining the strips 4 and 14 into a position-retaining bar 2.

A rivet (not shown) is inserted through the hole 6 and fixed to a cross rod 42 while a rivet (not shown) is inserted through the hole 16 and fixed to the other cross rod 42, thereby attaching the position-retaining bar 2 to the stroller 40.

Figure 2:
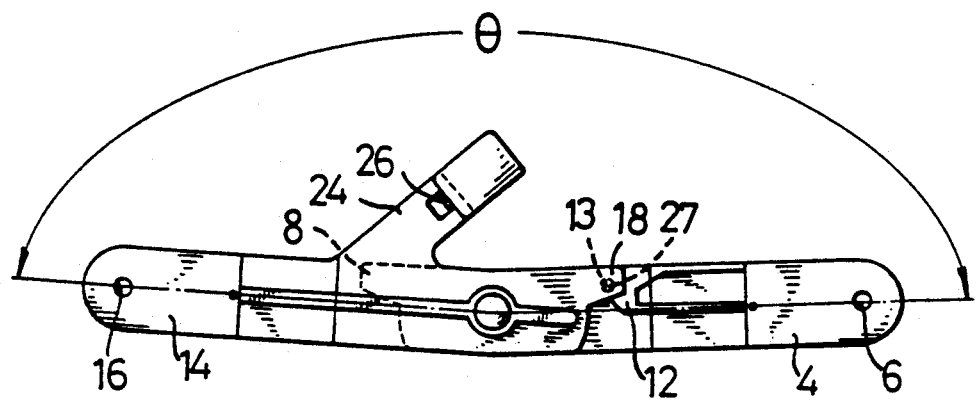
FIG. 2 is a plane view of a position-retaining bar for a toy stroller in an unfolded position in accordance with the present invention.

Referring to FIG. 2, an angle 8 between a line dissecting centers of the hole 6 and of the rivet and a line dissecting centers of the hole 16 and of the rivet is slightly less than 180° when the finger 8 rests on the stop 22 and when the finger 18 rests on the stop 12 while the protrusion 27 is received in the bore 13. Further referring to FIG. 4, if front wheels of the toy stroller 40 are hindered during a stroll therewith, the toy stroller 40 is apt to be folded, i.e., the angle Θ is apt to decrease. This situation will not be realized, as the fingers 8 and 18 respectively rest on the stops 22 and 12. The toy stroller 40 is securely retained in position.

Figure 3:
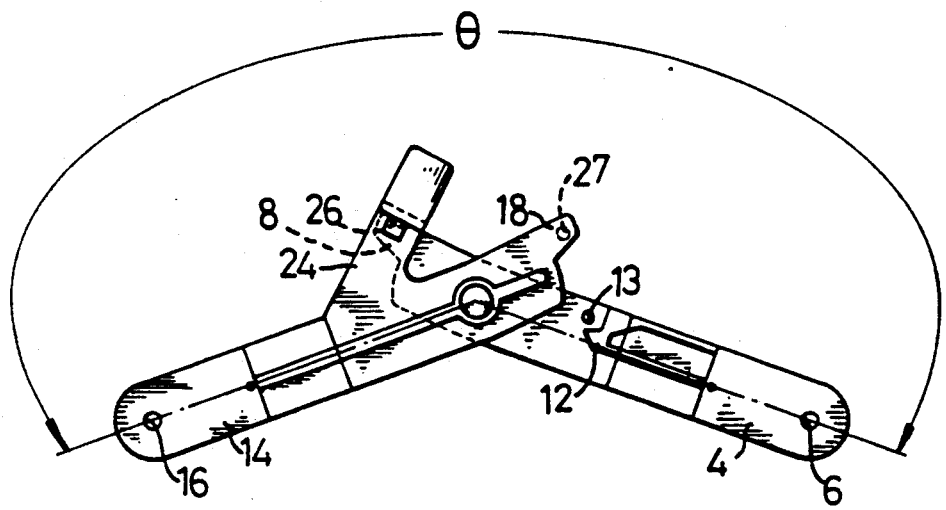
FIG. 3 is a plane view of a position-retaining bar for a toy stroller in a folded position in accordance with the present invention.

Referring to FIG. 3, the toy stroller 40 is not adequately unfolded at beginning, i.e., the angle Θ is greater than 180°. If the front wheels of the toy stroller 40 are hindered during a stroll therewith, the toy stroller 40 is apt to be folded, i.e., the angle Θ is apt to increase. The angle 8 keeps on increasing until the finger 8 is stopped by the wedge-like portion of the buckle 24 and retained between the buckle and the tab 26. A length of the buckle 24 determines the amount of angle that the position-retaining bar 2 is allowed to be folded. Therefore, the toy stroller 40 will not be further folded, thereby protecting the child from tumbling and falling.

To fold the toy stroller 40, the child just bends the buckle 24 away from the strip 4 in order to allow the finger 8 to pass the wedge-like portion of the buckle 24, thereby allowing the toy stroller to be folded. The unfolding of the toy stroller 40 is elementary. Meanwhile, the position-retaining bar 2 is unfolded. When the finger 8 contacts the inclined surface of the wedge-like portion of the buckle 24, the finger 8 slides on the inclined surface so as to pass the wedge-like portion of the buckle 24, thereby allowing the toy stroller 40 to be unfolded.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A position-retaining bar for a stroller, comprising:

a first strip pivotally combined with a second strip, wherein:

said first strip having a first end pivotally connected to a segment of the stroller, a second end, a finger extending from said second end, a side and a stop formed on said side; and said second strip having a first end pivotally connected to another segment of the stroller, a second end, a finger extending from said second end, a side, a stop formed on said side and a flexible buckle extending therefrom and having a wedge-like portion formed with an inclined surface facing said first strip and a tab protruding downwardly from said wedge-like portion for restraining said first strip when said position-retaining bar is unintentionally folded.

* * * * *